(12) United States Patent
Rau et al.

(10) Patent No.: US 7,069,279 B1
(45) Date of Patent: Jun. 27, 2006

(54) TIMELY FINALIZATION OF SYSTEM RESOURCES

(75) Inventors: Lawrence R. Rau, Dublin, NH (US); Craig F. Newell, Lowell, MA (US); Frank E. Barrus, New Ipswich, NH (US)

(73) Assignee: SaVaJe Technologies, Inc., Chelmsford, MA (US)

( * ) Notice: Subject to any disclaimer, the term of this patent is extended or adjusted under 35 U.S.C. 154(b) by 602 days.

(21) Appl. No.: 10/287,858

(22) Filed: Nov. 4, 2002

(51) Int. Cl.
*G06F 17/30* (2006.01)

(52) U.S. Cl. .................. 707/206; 707/102; 707/103 R; 707/205; 714/35; 717/154

(58) Field of Classification Search .................. 707/10, 707/103 R, 204, 205, 206, 2, 102; 714/53, 714/35; 717/116, 148, 154; 711/2, 200
See application file for complete search history.

(56) References Cited

U.S. PATENT DOCUMENTS

| | | | |
|---|---|---|---|
| 5,485,613 A * | 1/1996 | Engelstad et al. .......... 707/206 |
| 5,535,329 A * | 7/1996 | Hastings ...................... 714/35 |
| 5,687,368 A * | 11/1997 | Nilsen ..................... 707/103 R |
| 5,699,539 A * | 12/1997 | Garber et al. ................... 711/2 |
| 5,835,701 A * | 11/1998 | Hastings ...................... 714/35 |
| 6,047,280 A * | 4/2000 | Ashby et al. ................... 707/2 |
| 6,065,020 A * | 5/2000 | Dussud ....................... 707/206 |
| 6,081,665 A * | 6/2000 | Nilsen et al. ................ 717/116 |
| 6,249,793 B1 * | 6/2001 | Printezis et al. ............ 707/206 |
| 6,370,539 B1 * | 4/2002 | Ashby et al. ............... 707/102 |
| 6,581,077 B1 * | 6/2003 | Sokolov et al. ............. 707/206 |
| 6,584,478 B1 * | 6/2003 | Spertus ....................... 707/206 |
| 6,769,004 B1 * | 7/2004 | Barrett ....................... 707/206 |
| 6,795,836 B1 * | 9/2004 | Arnold et al. .............. 707/206 |
| 6,901,587 B1 * | 5/2005 | Kramskoy et al. .......... 717/154 |

OTHER PUBLICATIONS

Wilson, P. R., "Uniprocessor Garbage Collection Techniques," pp. 1-34. Paper appearing in the proceedings of the 1992 International Workshop on Memory Management (St. Malo, France, Sep. 1992).

"SavaJe OS: Solving the Problem of the Java™ Virtual Machine on Wireless Devices." SavaJe Technologies, Inc. (2002).

Lindholm, T., and Yellin, F. VM Spec. The Java™ Virtual Machine Specification [online], 1999 [retrieved on Oct. 27, 2002]. Retrieved from the Internet <URL: http://java.sun.com/docs/books/vmspec/2nd-edition/html/VMSpecTOC.html>.

(Continued)

*Primary Examiner*—Shahid Alam
(74) *Attorney, Agent, or Firm*—Hamilton, Brook, Smith & Reynolds, P.C.

(57) ABSTRACT

A garbage collector, from time to time, and within a single cycle, determines objects that are eligible to have their associated memory freed; executes high-priority finalizers associated with such eligible objects as are determined; and after execution of a high-priority finalizer, deallocates the memory of the associated object. The garbage collector queues references to eligible objects that have non-high-priority finalizers in a list. After garbage collection is completed, a finalizer thread runs the queued non-high-priority finalizers and marks the associated objects as ready for deallocation. The garbage collector, during a subsequent cycle, then deallocates the memory associated with marked objects.

9 Claims, 5 Drawing Sheets

OTHER PUBLICATIONS

Lindholm, T., and Yellin, F. The Structure of the Java Virtual Machine. The Java™ Virtual Machine Specification [online], 1999 [retrieved on Oct. 25, 2002]. Retrieved from the Internet <URL: http://java.sun.com/docs/books/vmspec/2nd-edition/html/Overview.doc.html>.

Taak, S. Garbage Collection Overview in Java [online], [retrieved on Oct. 25, 2002]. Retrieved from the Internet <URL: http://www.iis.ee.ic.ac.uk/~frank/surp00/article2/st198/sandy.htm>.

"The Java Hotspot™ Performance Engine Architecture." Sun Microsystems, Inc. [online], 1999 [retrieved on Oct. 27, 2002]. Retrieved from the Internet: <URL: http://java.sun.com/PrintPage.jsp?url=http%3A//java.sun.com/products/hotspot/whitepap . . . >.

Pawlan, M. Reference Objects and Garbage Collection. Sun Microsystems, Inc. [online], Aug. 1998 [retrieved on Oct. 25, 2002]. Retrieved from the Internet <URL: http://java.sun.com/PrintPage.jsp?url=http%3A//developer.java.sun.com/developer/techniq . . . >.

Venners, B. Java's Garbage-Collected Heap. JavaWorld [online], Aug. 1996 [retrieved on Oct. 25, 2002]. Retrieved from the Internet <URL: http://www.javaworld.com/javaworld/jw-08-1996//jw-08-gc_p.html>.

Venners, B. Garbage Collection [online], [retrieved on Oct. 25, 2002]. Retrieved from the Internet <URL: http://www.cs.biu.ac.il/~luryar/docs/javaGarbage.html>.

Domani, T., et al., "Implementing An On-the-fly Garbage Collector for Java." IBM Haifa Research Laboratory, MATAM Advanced Technology Center, Haifa, Israel. No date given.

Wilson, P.R., et al., "Effective 'Static Graph' Reorganization to Improve Locality in Garbage-Collected Systems," pp. 177-191. Proceedings of the ACM SIGPLAN '91 Conference in Programming Language Design and Implementation (Toronto, Ontario, Canada, Jun. 26-28, 1991).

Gosling, J., et al., "Execution." Java Language Specification [online]. Sun Microsystems, Inc. [retrieved on Oct. 27, 2002]. Retrieved from the Internet <URL: http://java.sun.com/docs/books/jls/second_edition/html/execution.doc.html>.

Martin, V. Garbage Collection in Java [online], Feb. 19, 1998 [retrieved on Oct. 27, 2002]. Retrieved from the Internet <URL: http://trident.mcs.kent.edu/~vmartin/proj>.

Petit-Bianco, A. Java Garbage Collection for Real-Time Systems. Dr. Dobb's Journal [online], Oct. 1998 [retrieved on Oct. 27, 2002]. Retrieved from the Internet <URL: http://www.ddg.com/print/documentID=12673>.

Preiss, B.R. Data Structures and Algorithms with Object-Oriented Design Patterns in Java [online], 1998 [retrieved on Oct. 27, 2002]. Retrieved from the Internet <URL: http://www.brpreiss.com/books/opus5/html/page414.html>.

Wilson, P.R., and Johnstone, M.S., "Real-Time Non-Copying Garbage Collection," pp. 1-8. Position paper for the 1993 ACM OOPSLA Workshop on Memory Management and Garbage Collection.

Wilson, P.R., et al., "Caching Considerations for Generational Garbage Collection," pp. 32-42. In Proc. 1992 ACM Conf. on Lisp and Functional Programming (San Francisco, CA, Jun. 22-24, 1992).

Wilson, P.R., "Uniprocessor Garbage Collection Techniques." Submitted to ACM Computing Surveys, pp. 1-67.

Kakkad, S.V. OOPS Group Publications [online], 1991-1993 [retrieved on Oct. 29, 2002]. Retrieved from the Internet <URL: http://www/cs.texas.edu/users/oops/papers.html>.

Java Programming Language Concepts. In *The Java™ Virtual Machine Specification* [online], Sun Microsystems, Inc. 1999 [retrieved on Oct. 29, 2002]. Retrieved from the Internet <URL: http://java.sun.com/docs/books/vmspec/2nd-edition/html/Concepts.doc.html>.

Venners, B. Garbage Collection. Chapter 9 of Inside the Java Virtual Machine [online], Oct. 20, 2002 [retrieved on Oct. 25, 2002]. Retrieved from the Internet <URL: http://www.artima.com/insidejvm/ed2/gcP.html>.

Goetz, B., "Java theory and practice: Garbage collection and performance," http://www-128.ibm.com/developerworks/java/library/j-jtp01274.html, downloaded Dec. 1, 2005 (8 pp.).

* cited by examiner

List of objects having system finalizers

TIMELY FINALIZATION OF SYSTEM RESOURCES

BACKGROUND OF THE INVENTION

In a program written in an object-oriented language, a root set of references contains variables, immediately accessible to the program, that point to (or reference) objects. Objects are "reachable" by the program, or "live" if they can be accessed through a chain of references starting at the root set. Other objects that cannot be referenced through the chain are unreachable, and cannot be executed by the program. The memory associated with such unreachable objects can thus be reclaimed, and the unreachable objects may be tagged or listed as candidates for garbage collection.

Garbage collection is the automatic reclamation of computer storage. Paul R. Wilson, "Uniprocessor Garbage Collection Techniques", 1992, available on the Web at ftp.cs.utexas.edu/pub/garbage/gcsummary.ps, and Bill Venners, "Garbage Collection", Chapter 9 of Inside the Java Virtual Machine, on the Web at www.artima.com/insidejvm/ed2/gcP.html, both of which are incorporated by reference herein, both of which provide excellent surveys of different garbage collection techniques, the individual aspects of which are beyond the scope of this disclosure.

In an object oriented language such as Java, it is common for some objects to have a declared finalizer method, to be called when the system determines that there are no active references to the object and that the object is thus eligible to have its memory reclaimed. Declaring a finalizer allows the developer to perform some operations, such as freeing system resources, prior to the system's reclaiming the object's memory. The finalizer construct normally co-exists with the idea of automatic garbage collection.

SUMMARY OF THE INVENTION

"The Java programming language does not specify how soon a finalizer will be invoked, except to say that it will happen before the storage for the object is reused." Gosling et al., "The Java Language Specification", Section 12.6, Second edition, (2000), incorporated by reference herein in its entirety.

The present invention allows clean up of operating system resources, such as file descriptors, in a timely and efficient manner, by allowing the declaration and implementation of a novel system finalizer, as distinguished from the normal finalizer defined by Gosling. The system finalizer of the present invention performs the reclamation of vital system resources which benefit from a more timely and efficient reclamation process than is provided by the normal finalizer.

In an embodiment of the present invention, an object with a system finalizer is placed on a single system finalization queue. The objects on the system finalization queue have their finalizer methods executed at a high priority in a kernel context before being immediately reclaimed.

Objects with normal finalizers are placed on a per-process normal finalization queue. Each of these objects has its finalizer method called, at a lower priority, within the context of the process that allocated the object. Once the finalizer method has been called, the object is effectively marked as no longer requiring finalization and is left for the next garbage collection (GC) cycle to collect.

Differences between system finalizers of the present invention and normal finalizers as previously defined in the art are outlined in Table 1 below.

TABLE 1

| | High-priority system finalizer | Non-high-priority normal finalizer |
|---|---|---|
| Context of Execution | Kernel | User Process |
| Latency of reclamation | One GC cycle | Two or more GC cycles |

In at least one embodiment of the present invention, a high-priority system finalizer can be identified without altering the programming language used. For example, at least one embodiment uses an existing method declaration attribute, i.e., "native", to signal to the runtime system that an object's finalizer is a system finalizer. Other techniques can be utilized, such as an explicit call to a system registration method during object creation. Once the object is identified, the above described system finalizer processing can be performed.

Thus, an embodiment of the present invention provides a method for timely and efficient cleanup of system resources by overloading an existing programming language construct—the finalizer. The new high-priority system finalizer is a light-weight method that matches objects to their creating process while in a shared object system (one where objects are not naturally bound to a specific process) for the purpose of performing finalization.

A garbage collection system according to an embodiment of the present invention includes a garbage collector which, from time to time, and within a single garbage collection cycle: determines objects that are eligible to have their associated memory freed (i.e., unreachable objects); executes high-priority system finalizers associated with such eligible objects as are determined; and after execution of a high-priority finalizer, deallocates the memory of the associated object.

When the GC determines that an unreachable object has a system finalizer, the GC may execute the system finalizer immediately, or alternatively, the GC may place the object onto a system finalization queue. The system then executes the system finalizable objects placed in the system finalization queue, and the GC completes its cycle.

Each object is associated with information that identifies that object as having a system finalizer. This information is preferably carried by the object itself. Alternatively, a list of such objects could be maintained. When the GC determines that an object is unreachable, the GC checks to see if that object has a system finalizer. If the object does have a system finalizer, the GC queues the object into the system finalization queue. When all unreachable objects have been processed, the queued system finalizers are executed and the associated objects' memories freed.

The GC is a system process, and all objects are within a single global address space. Nonetheless, there are distinct processes, and "knowledge" of which process created a particular object is maintained, using a cross-reference table or some other means.

An object with a normal finalizer is placed onto a "to be finalized" queue associated with the process that created or allocated the object. (Thus for n processes there may be n such lists.) After the GC cycle ends, a "finalizer thread" in each process is scheduled (like any other thread) to process the objects on the "to be finalized" queue. After such processing, the object may once again be unreachable and, if so, will be discovered during a subsequent GC cycle, at which time the GC, noting that the object was already "finalized" and does not need to be re-queued, frees the associated memory.

From the time the object is first queued, through when its finalizer is run and finally to when the object is again detected and released by the GC, there may be many GC cycles. Of course, an object having its finalizer executed could cause the object to become reachable again—in this case the object is not collected even after its finalizer is executed, at least until it again becomes unreachable.

Non-high-priority finalizers associated with objects eligible for deallocation execute at indeterminate times. After their execution, their associated objects are usually unreachable and hence ready for deallocation. Memory associated with an object ready for deallocation is deallocated at a time that is indeterminate relative to when the finalizer was executed.

In a mark-and-sweep GC, after a normal finalizer is executed, the associated object is left as unreachable. Thus, during a subsequent cycle the GC will discover that the object is garbage and, noting that the finalizer has already executed, frees the object.

High-priority finalizers are executed at a system level. The system may be a shared object system which has access to objects of different applications.

The system may further include a Java Virtual Machine under which the garbage collector and application programs execute.

High-priority finalizers may be identified using an existing method declaration attribute, for example, the "native" method attribute used in Java. Alternatively, high-priority finalizers may be identified through explicit calls to a system registration method during object creation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

As the Java programming language is becoming more and more popular, it is becoming desirable to be able to run Java applications in many different environments, for example in computers, telephones, general appliances and the like. A Java program is typically compiled from source code into bytecodes, which are interpreted by a Java Virtual Machine (JVM). The JVM typically runs under an operating system (OS) that is native to the hardware running the system. Thus, a Java program and the JVM under which it runs is viewed as one of many processes by the operating system.

An embodiment of the present invention operates within an operating system which is specifically designed to run Java applications—the JVM language runtime system is merged with the operating system, so that the JVM can allow applications to use the same resources. Such a system is described in a patent application filed on the even day herewith, Ser. No. 10/282,856, entitled "METHOD AND APPARATUS FOR INTEGRATING AN APPLICATION PROGRAMMING LANGUAGE RUNTIME WITH AN OPERATING SYSTEM KERNEL," by Lawrence R. Rau, Craig F. Newell, and Frank E. Barrus, and incorporated herein by reference in its entirety.

In a resource-constrained device (where resources include, for example, speed, display size, memory), such an OS allows different applications to share resources. Thus, it is important that when one program is done with a resource, for example, when an object using the resource becomes unreachable, the resource be freed up and made available for another program as soon as possible.

Figure 1:
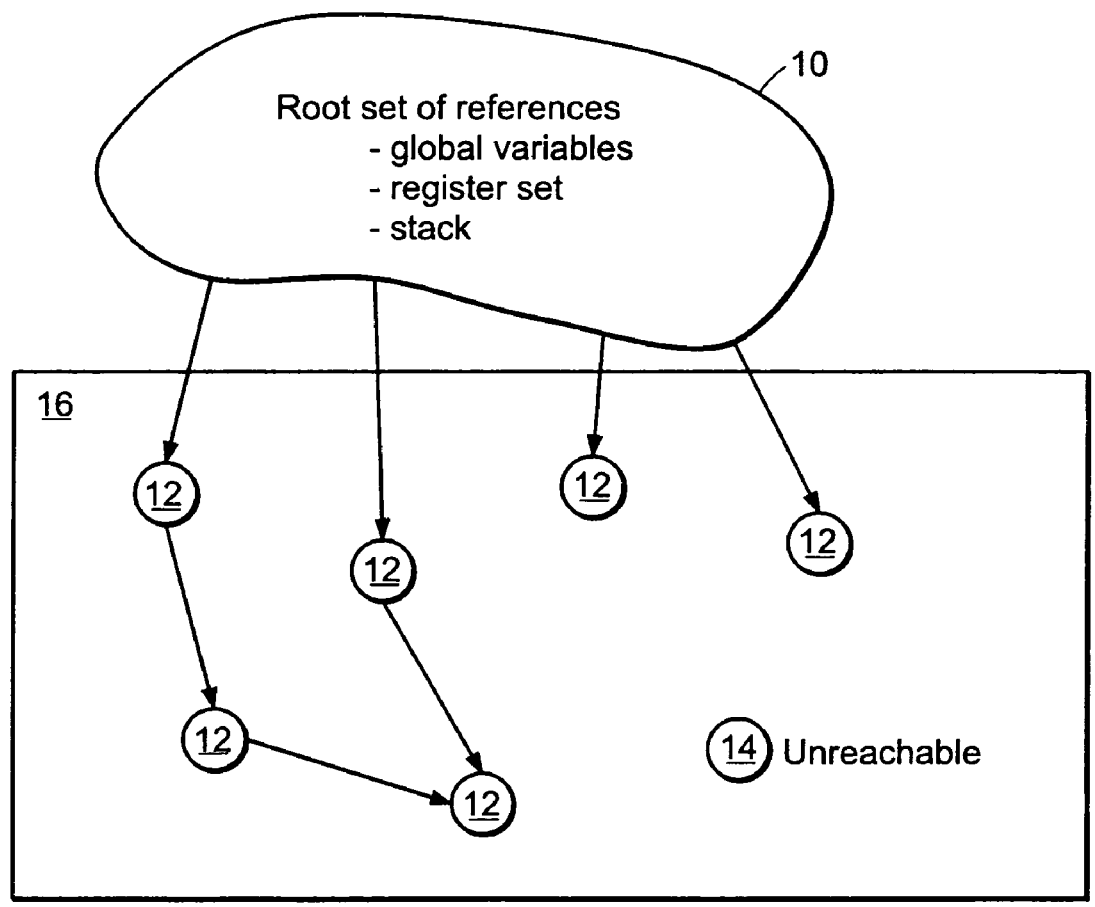
FIG. 1 is a graph illustrating the concept of reachable and unreachable objects.

FIG. 1 is a graph illustrating the concept of reachable and unreachable objects. For each application, there is a root set of references 10. These references are directly accessible by the application, and may include, for example, global variables, register sets and stack variables.

These references are typically pointers to objects 12 in the memory heap 16. These objects may in turn refer to other objects, as indicated by the arrows. For example, when an object myObject of class Foo is created, using the statement myObject=new Foo( ); //creates new object Foo myObject becomes a reference to the new object. The value contained in myObject may be copied to another variable, say yourObject, such that there are two references, myObject and yourObject, to the same object created by the above statement.

The statement myobject=null;

clears the pointer myObject. However, yourObject is still a valid pointer to the object. Thus, the memory associated with the object cannot be reclaimed as it may still be in use.

When yourObject is set to null, however, assuming there are no other references to the object, the object will become unreachable, as at 14 in FIG. 1. That is, there is no way to reach object 14 from the root set of references 10 that are directly accessible to the application. Thus, the memory associated with the object 14 can be reclaimed, and so object 14 can be marked by a garbage collector as a candidate object.

Figure 2:
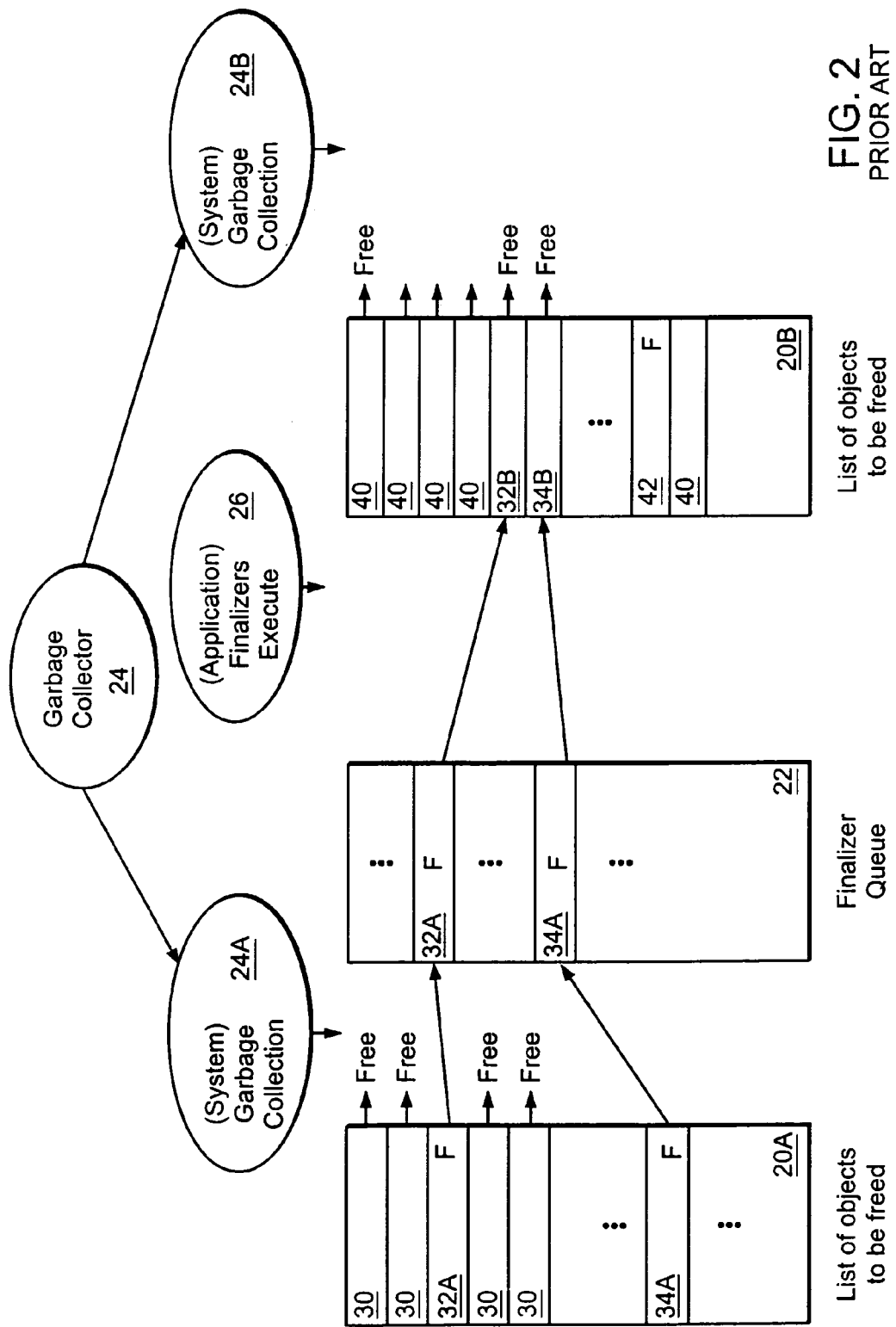
FIG. 2 is a schematic diagram illustrating generally how a garbage collector works in conjunction with finalizers.

FIG. 2 is a schematic diagram illustrating generally how a garbage collector 24 works in conjunction with finalizers 26. Although the description refers especially to Java implementations, one skilled in the art would recognize that the invention is not limited only to Java, nor to "finalizers" per se, but would rather be relevant in any object oriented environment in which automatic garbage collection is implemented with a method that automatically runs just before an object's memory is reclaimed.

Here, reference numbers 24A and 24B indicate the same garbage collector in two different cycles. A list of objects to be freed is also shown at the two cycles, as 20A and 20B.

Although the garbage collector is also responsible for identifying objects ripe for garbage collection, for simplicity here it is assumed that such identification has already been performed and that those objects which are candidates for garbage collection have already been placed in the list 20A.

In this example, several objects 30 which do not have finalizers (or at least in the case of Java, in which the Object.Finalize( ) method has not been overwritten), have been found to be ripe for garbage collection and have been placed in the list 20A (These entries 30 are typically references to objects, but for simplicity "object" and "reference" to the object are used interchangeably.) Objects 32A and 34A, also ripe for collection, have finalizers, as indicated by the letter F.

During the first garbage collection cycle, at 24A, memory associated with those objects 30 which do not have finalizers is reclaimed (freed). Objects 32A, 34A with finalizers, however, cannot be reclaimed immediately because their finalizers must first be executed within their respective process's context. Instead, these objects 32A, 34A are copied to a finalizer queue 22. Although only one finalizer queue 22 is shown in FIG. 2 for convenience, typically each process has its own finalizer queue.

Each finalizer is executed by a finalizer thread running in the respective application's context. Therefore, the finalizers do not execute during garbage collection. At 26, finalizers are executed for the objects listed in the queue 22. Note however, that in Java, there is no guarantee has to how soon a finalizer will execute (execution time is indeterminate), or even which order the finalizers will execute in.

After the finalizers for objects 32A and 34A have executed (performing their defined tasks, e.g., freeing up whatever system resources they may have been using), they are put back in the list of objects to be freed 20B. Alternatively, they could be placed in yet another list or queue. Since their respective finalizers have been executed, they are no longer tagged as objects to be finalized, and hence they have been relabeled as 32B and 34B. On the next garbage collection cycle 24B, their associated memory will be reclaimed.

FIG. 2 also demonstrates that by this next garbage collection cycle, additional objects 40, 42 ready for garbage collection could have been detected and added to the list 20B.

Figure 3:
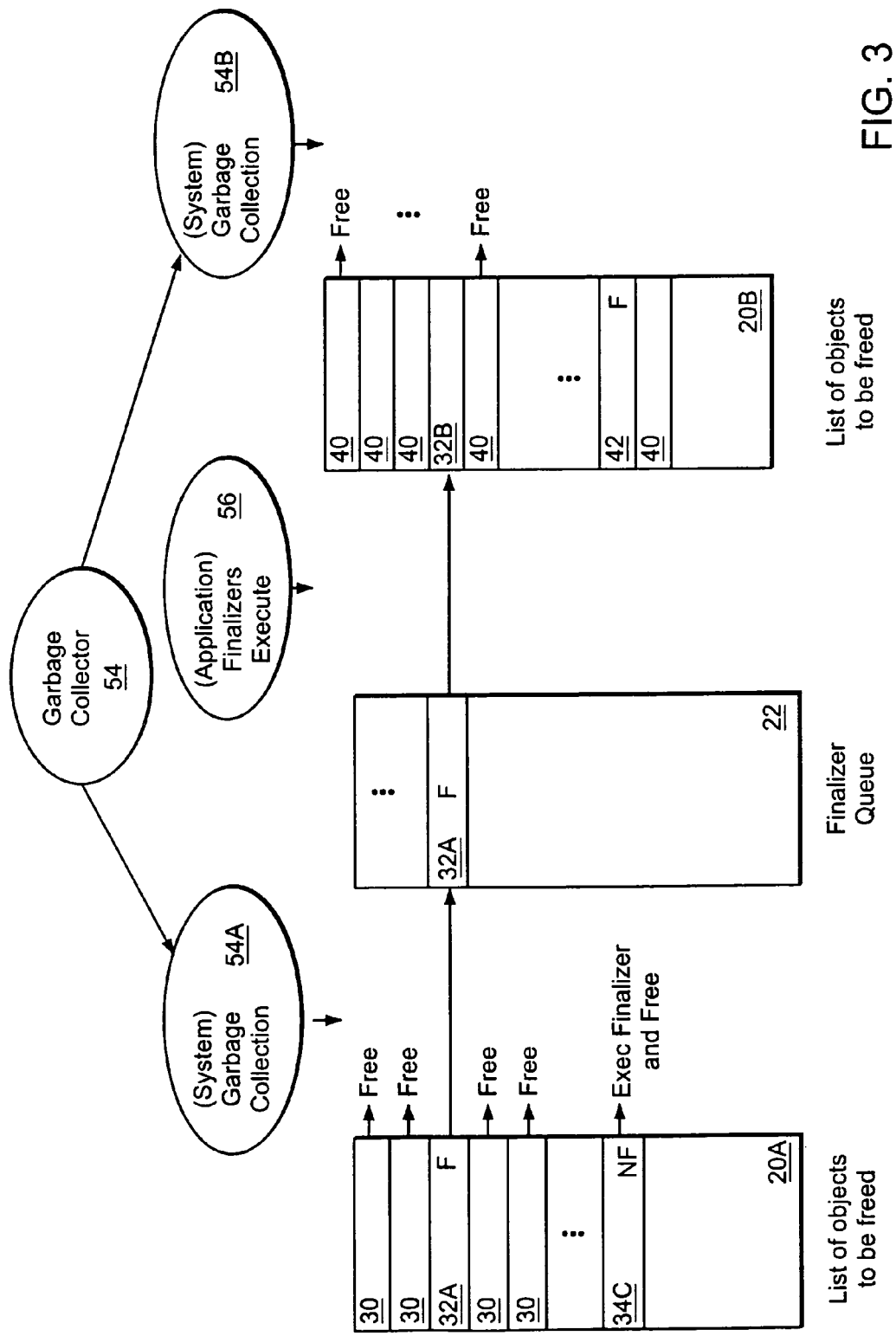
FIG. 3 is a schematic diagram illustrating an embodiment of the present invention.

FIG. 3 is a schematic diagram illustrating an embodiment of the present invention. FIG. 3 is similar to FIG. 2, but here, object 34C has a system or native finalizer, and so is labeled NF.

Thus, as FIG. 3 shows, the list 20 of candidate objects holds both native or system (or high-priority) finalizers 34C (marked "NF") and normal (non-high-priority) finalizers 32A (marked "F"). Of course, the list 20 also holds objects 30 with no finalizers, whose memory can be reclaimed immediately.

Garbage collector 54 recognizes that object 34C has a system finalizer, executes the object's finalizer immediately and frees the associated memory, all in a single garbage collection cycle 54A. Alternatively, objects with system finalizers may be placed into a "system finalization queue." Then, still within the same GC cycle, the system executes the system finalizers of the queued objects and frees the associated objects' memories. Either way, this can be accomplished because system finalizers run in the same system context as the garbage collector. Thus, system resources held by objects with system finalizers become available much sooner than occurs for objects with normal finalizers, where the latency includes at least one additional garbage collection cycle 54B.

Figure 4:
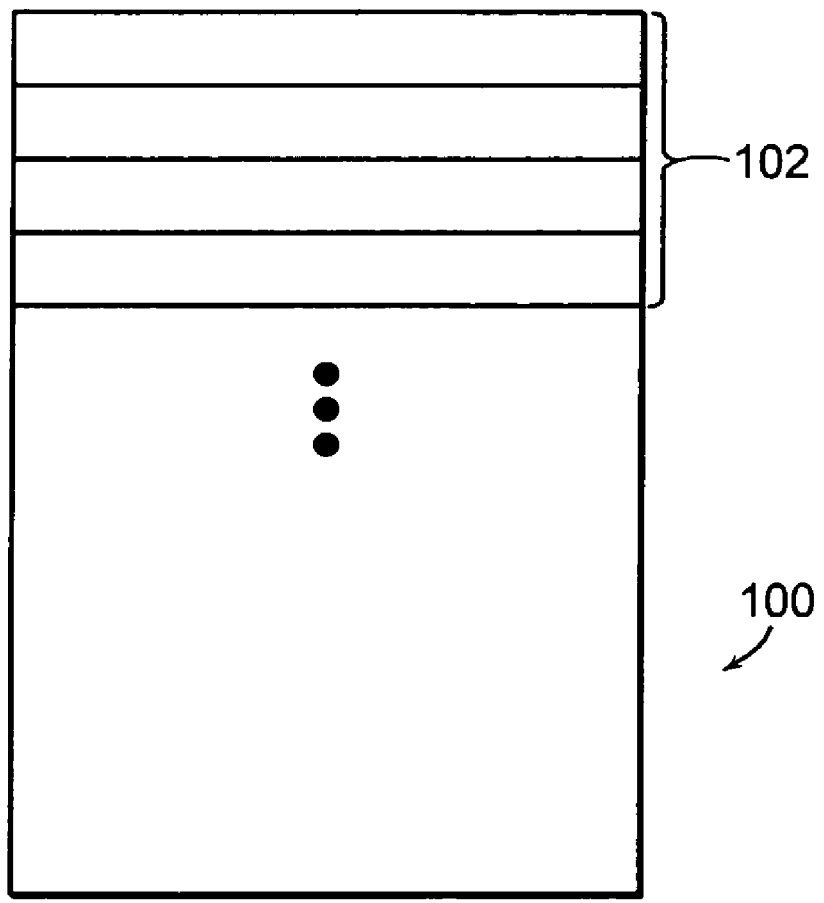
FIG. 4 is a schematic diagram illustrating an embodiment of the present invention, in which a list of objects having system finalizers is maintained.

FIG. 4 is a schematic diagram illustrating an embodiment of the present invention, in which a list 100 of objects having system finalizers is maintained. This list is accessible by the garbage collector. This is one way in which the garbage collector 54 of FIG. 3 may determine whether an object has a system finalizer.

To designate a system finalizer, in one embodiment the system finalizer is declared, using a preexisting construct, as "native". For example, the class definition below:

```
Class F {
    void Foo( ) { };
    native Bar( );
    native Finalizer( );
}
``` declares F.Finalizer to be a system finalizer, to be run in a system context by the garbage collector at the point of garbage collection 54A (FIG. 3), thereby avoiding the extra garbage collection cycle 54B and the accompanying latency. System resources are therefore cleaned up and made accessible to other processes more expediently than if it were necessary to wait for the next garbage collection cycle, which runs at an indeterminate time. The preexisting "native" construct is also used, as shown above, for its original purpose, to declare a method such as Bar( ) to be native, that is, implemented in platform-dependent code.

Figure 5:
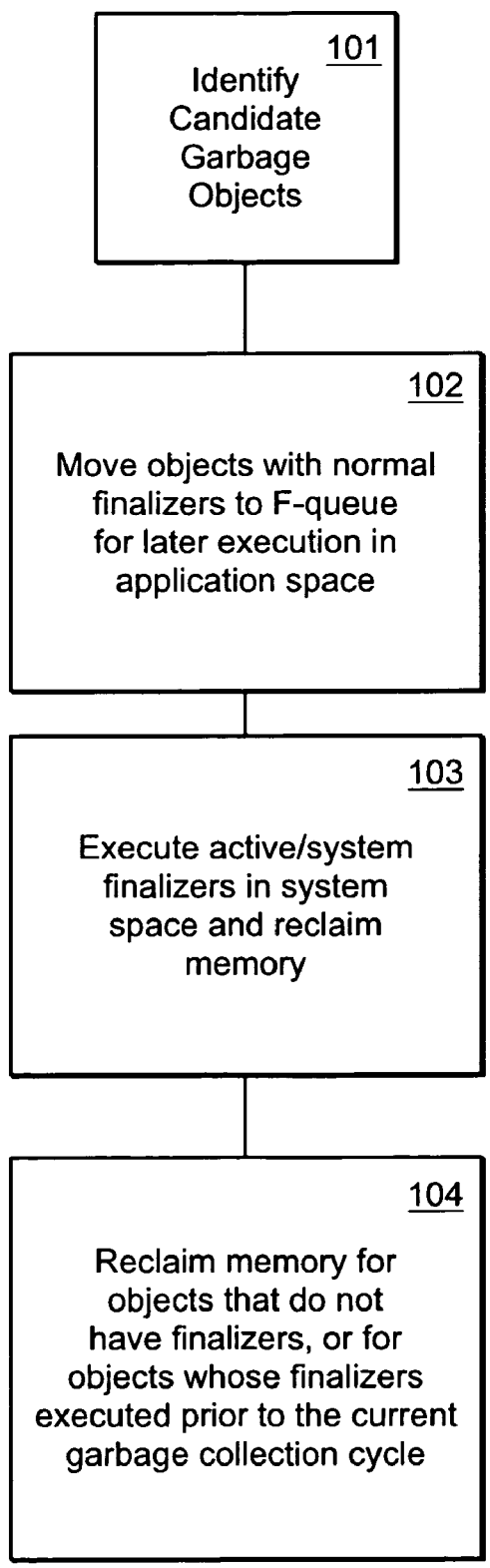
FIG. 5 is a flowchart illustrating the various steps performed by a garbage collector of an embodiment of the present invention

FIG. 5 is a flowchart illustrating the various steps performed by a garbage collector 54 of an embodiment of the present invention, although it should be understood that the steps may be in any order and may even be intermingled with each other.

At step 101, objects that are candidates for garbage collection, i.e., objects that are unreachable, are identified. At step 102, objects with "normal" (non-high-priority) finalizers are copied or moved to the finalizer queue 22 (F-queue), to be executed later by the applications which own the objects. At step 103, system or "native" (high-priority) finalizers are executed by the garbage collector and have their memory reclaimed. Finally, at step 104, other garbage can also be freed right away. This includes objects which do not have finalizers, as well as objects with normal finalizers that were executed prior to the current garbage collection cycle.

While this invention has been particularly shown and described with references to preferred embodiments thereof, it will be understood by those skilled in the art that various changes in form and details may be made therein without departing from the scope of the invention encompassed by the appended claims. For example, while one embodiment uses a mark-and-sweep garbage collector, the invention could be adapted for other types of garbage collection, including but not limited to reference counting garbage collectors, tracing collectors (of which mark-and-sweep is one variety), compacting collectors, copying collectors and the like.

What is claimed is:
1. A method for deallocating memory, comprising:
upon determining that an object associated with a high-priority finalizer capable of executing at a system level is eligible to have said object's memory freed, executing the high-priority finalizer;

deallocating, upon completion of said executing of said high-priority finalizer, said object's memory;

performing within one garbage collection cycle said deallocating and said executing to minimize latency;

executing, at indeterminate times, non-high-priority finalizers associated with objects eligible for deallocation, said objects becoming unreachable; and freeing, at an indeterminate time relative to when an object's non-high-priority finalizer is executed, memory associated with said object.

2. The method of claim 1, wherein the high-priority finalizer is executed by a garbage collector.

3. The method of claim 2, wherein the garbage collector is a mark-and-sweep garbage collector.

4. The method of claim 1, wherein the system is a shared object system which has access to objects of different applications.

5. The method of claim 1, wherein said method executes within a Java Virtual Machine.

6. The method of claim 1, wherein high-priority finalizers are identified using an existing method declaration attribute.

7. The method of claim 6, wherein said existing method declaration attribute is "native".

8. The method of claim 1, wherein high-priority finalizers are identified through explicit calls to a system registration method during object creation.

9. A system for deallocating memory, comprising:

means for executing a high-priority finalizer capable of executing at a system level upon a determination that an object associated with said high-priority finalizer is eligible to have said object's memory freed;

means for deallocating said object's memory upon completion of said means for executing said high-priority finalizer, wherein said means for reallocating and said means for executing perform the high-priority finalizer and reallocating in one garbage collection cycle to minimize latency;

means for executing, at indeterminate times, non-high-priority finalizers associated with objects eligible for deallocation, said objects becoming unreachable; and means for freeing, at an indeterminate time relative to when an object's non-high-priority finalizer is executed, memory associated with said object.

* * * * *